United States Patent [19]
Lee

[11] Patent Number: 5,936,687
[45] Date of Patent: Aug. 10, 1999

[54] LIQUID CRYSTAL DISPLAY HAVING AN ELECTROSTATIC DISCHARGE PROTECTION CIRCUIT AND A METHOD FOR TESTING DISPLAY QUALITY USING THE CIRCUIT

[75] Inventor: Joo-Hyung Lee, Seoul, Rep. of Korea

[73] Assignee: Samsung Electronics Co., Ltd., Suwon, Rep. of Korea

[21] Appl. No.: 09/160,186

[22] Filed: Sep. 25, 1998

[30] Foreign Application Priority Data

Sep. 25, 1997 [KR] Rep. of Korea ............ 97-48777
Jun. 5, 1998 [KR] Rep. of Korea ............ 98-20792
Sep. 16, 1998 [KR] Rep. of Korea ............ 98-38209

[51] Int. Cl.$^6$ .................................. G02F 1/1333
[52] U.S. Cl. .............................. 349/40; 345/69
[58] Field of Search ................... 349/40; 345/69

[56] References Cited

U.S. PATENT DOCUMENTS 5,668,032  9/1997  Holmberg et al. ............ 438/144
5,805,246  9/1998  Lee et al. ........................ 349/40
5,852,480  12/1998 Yajima et al. ................... 349/40

Primary Examiner—William L. Sikes
Assistant Examiner—Robert J. Hollingshead
Attorney, Agent, or Firm—Howrey & Simon

[57] ABSTRACT

A liquid crystal display having a circuit to protect against static electricity makes passages in which static electricity can flow, by connecting diodes between a plurality of data lines, gate lines and a plurality of shorting lines in the same or opposite direction as current flow. Accordingly, the circuit protects a liquid crystal display from static electricity. A testing method of display quality checks whether the data lines and the gate lines are shorted or not by applying signals to the gate lines and the data lines through shorting lines and making mutually inverted output voltages appear in contiguous pixels.

12 Claims, 12 Drawing Sheets

LIQUID CRYSTAL DISPLAY HAVING AN ELECTROSTATIC DISCHARGE PROTECTION CIRCUIT AND A METHOD FOR TESTING DISPLAY QUALITY USING THE CIRCUIT

BACKGROUND OF THE INVENTION (a) Field of the Invention

The present invention relates to a liquid crystal display having an electrostatic discharge (ESD) protection circuit and a method for testing display quality using the circuit.

(b) Description of the Related Art

A liquid crystal display (LCD), uses the property of varying light transmittance according to the level of voltage applied to the liquid crystal to display images. The LCD has the advantage of requiring a lower voltage than that required by other types of displays.

Generally, the LCD is manufactured on a glass substrate. Because such a glass substrate is non-conductive, abruptly generated charges cannot spread over the glass substrate, making the LCD susceptible to damage from electrostatic charges. Consequently, it is possible for an insulating layer and other elements formed on the glass substrate to become damaged, from electrostatic charges.

To solve the above problem, it is common to use shorting bars on the glass substrate to connect all metal lines such as gate lines and data lines transmitting scanning signals and image signals to the pixels. Alternatively, a circuit, which employs nonlinear elements, to protect against electrostatic charges is used.

When shorting bars are connected to the metal lines, metal typically remains exposed around edges of the glass after a scribing process. In order to insulate the exposed metal, a non-conductive adhesive is thinly applied around the edges of the glass. Unfortunately, it is difficult to control the uniformity of the adhesive around the edges of the glass. Furthermore, this is an additional step that needs to be performed.

As stated before, a circuit is often used to protect against static electricity, and will be described hereinafter with reference to FIG. 1 and FIG. 2.

Figure 1:
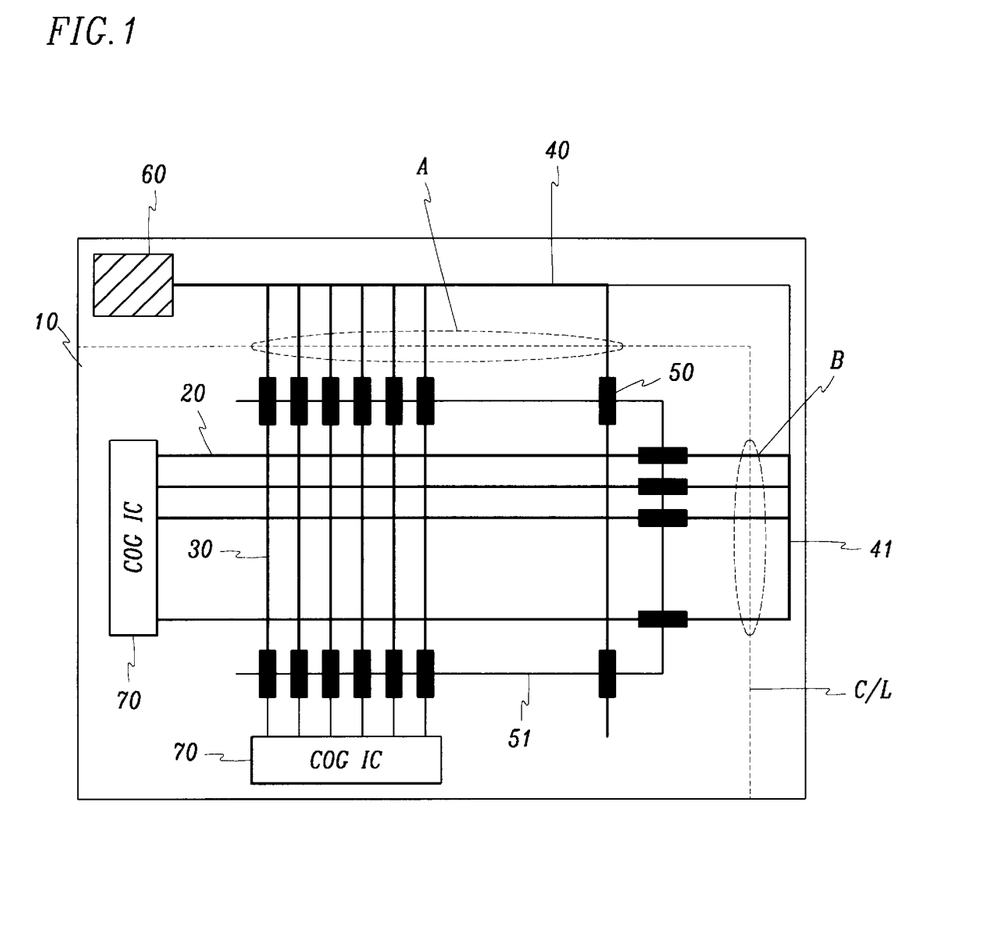
FIG. 1 is a wiring diagram of a conventional LCD substrate using shorting bars.

FIG. 1 shows a wiring diagram of a conventional LCD substrate using shorting bars. A plurality of gate lines 20 and data lines 30 are respectively formed horizontally and vertically on a substrate 10 to protect the LCD against static electricity. The gate lines 20 and data lines 30 are connected at the edge of the substrate 10 by shorting bars 40 and 41, respectively. The shorting bar 40 connecting the data lines 30 and the shorting bar 41 connecting the gate lines 20 are interconnected. A testing pad 60, for inputting test signals, is connected to the end of the shorting bar 40.

During the manufacture of the LCD damage caused by static electricity generated in the data lines 30 and the gate lines 20 is minimized by grounding the shorting bar 40, through which the static electricity is dispersed. The shorting bar 40 can also be used for detecting display defects in the LCD. That is, when applying a predetermined signal to the shorting bars 40 and 41, all pixels of the LCD simultaneously turn ON. However, if there are any defect in the data line 30, the gate line 20 or a thin-film transistor, the pixels appear black as no signals are transmitted thereto.

To effectively discharge static electricity, protection circuit 50 including diodes for protecting against static electricity can be additionally provided on one or both sides of each data line 30 and each gate line 20.

Figure 2:
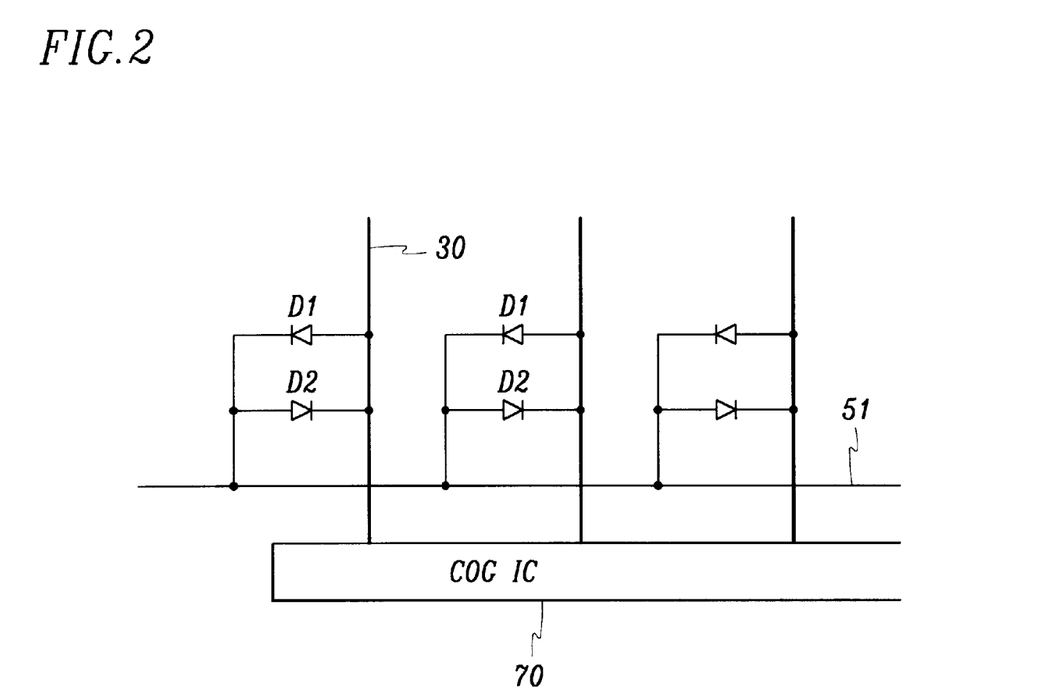
FIG. 2 is a circuit diagram of a protection circuit shown in FIG. 1.

FIG. 2 shows a schematic diagram of a protection circuit shown in FIG. 1. The connection and grounding of the protection diodes are shown in detail in the drawing. Diodes D1 and D2 are connected to each gate line 20 and data line 30 in forward and reverse directions, respectively. All the diodes 50 are connected through a shorting line 51. Therefore, the diodes D1 and D2, the data shorting bar 40 and the gate shorting bar 41 are all connected together.

In such an LCD, when static electricity is generated in one of the data lines 30, the diode D1 connected to the data line 30 turns on and the electric charges move to the grounding line 51 via the diode D1. The electric charges pass through the shorting line 51, turns on the diode D2 of an adjacent data line 30, then moves through this adjacent data line 30. Static electricity is thus gradually dissipated by moving through adjacent lines in this manner.

Testing of display quality of the substrate is conducted in the same way as described above. After testing display quality, the shorting bars 40 and 41 formed at the edge of substrate are removed by grinding along a cutting line C/L. However, in the case where an IC is a COG (chip on glass) mode, formed on the substrate 10, since the shorting bars 40 and 41 are formed on a side opposite to the IC, the shorting bars 40 and 41 must be removed by cutting rather than grinding, thereby complicating the overall manufacturing process.

Furthermore, when an electrostatic discharge protection circuit is used, as all data lines are applied with the same voltage, it is not possible to detect a short in the data and gate lines. Accordingly, the only way to detect a short-circuit in the data and gate lines is to actually drive the panel and test for defects. This added step increases the manufacturing time, and consequently increasing the overall manufacturing costs.

SUMMARY OF THE INVENTION

It is therefore an object of the present invention to provide improved ESD protection circuits for an LCD.

It is another object of the present invention to provide ESD protection circuits for an LCD, which increases the ability to test display quality.

These and other objects are achieved, according to the present invention, by providing a protection circuit having a plurality of diodes. The circuit according to the present invention may have a plurality of shorting lines crossing both ends of data line. One diode is connected in the same direction as the current flow from one side of data line to a first shorting line, and another diode is connected in the direction opposite to the current flow from one side of data line to a second shorting line.

Additionally the present invention comprises a diode circuit in which the diode connected in the same direction as the current flow and the diode connected in the direction opposite to the current flow are connected in parallel.

An odd data line and an even data line can be connected to separate shorting lines.

It is preferable that a diode is connected from one side of a gate line to a first shorting line and another diode is connected from one side of a gate line to a second shorting line. Also, the odd gate line and the even gate line can be connected to separate shorting lines.

According to the present invention, the display quality is tested by applying a voltage to the shorting line and along the data line to one direction selectively.

In the present invention, a voltage drop between diodes is created by applying high and low voltage to two of the shorting lines separately.

In one embodiment of the present invention, a certain level of voltages are applied to contiguous data lines and another level of voltages are applied to other shorting line for testing short between contiguous pixel lines. A clock pulse can be applied for testing voltages and mutually inverted clock pulse can be applied to the odd and even lines.

DETAILED DESCRIPTION OF THE PREFERRED EMBODIMENTS

The present invention will be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art.

Figure 3:
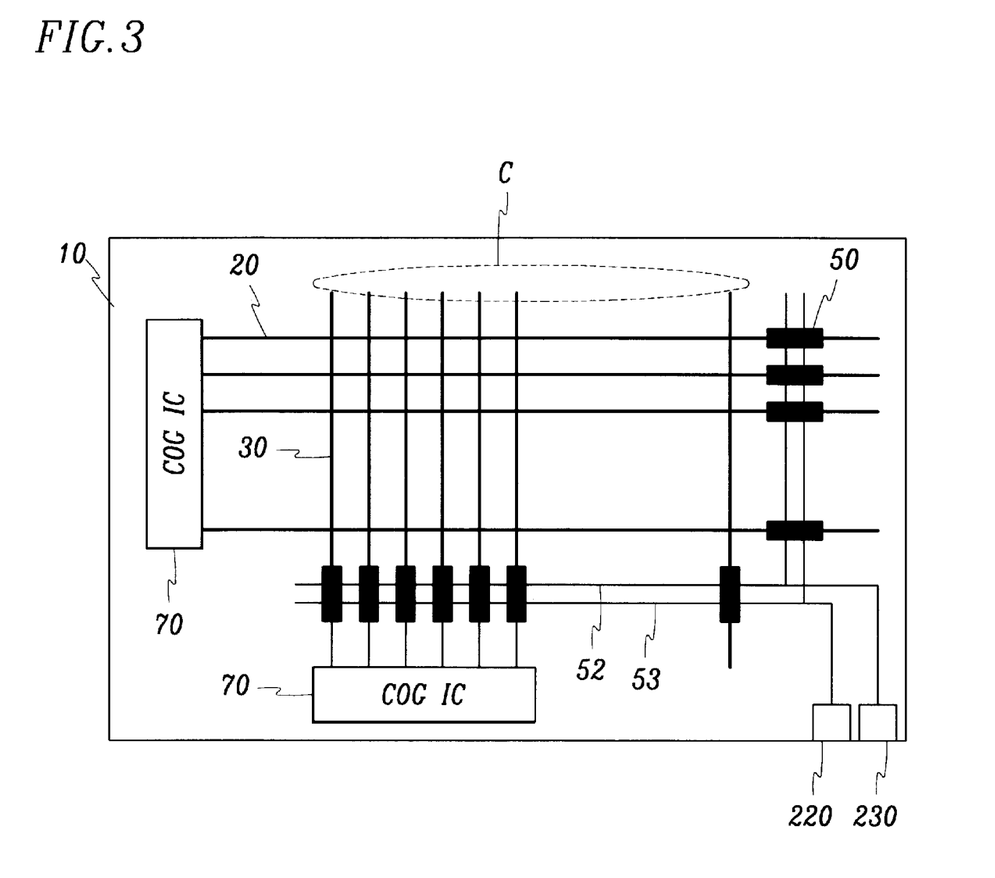
FIG. 3 is a wiring diagram of a LCD substrate in accordance with a first embodiment of the present invention.
Figure 4:
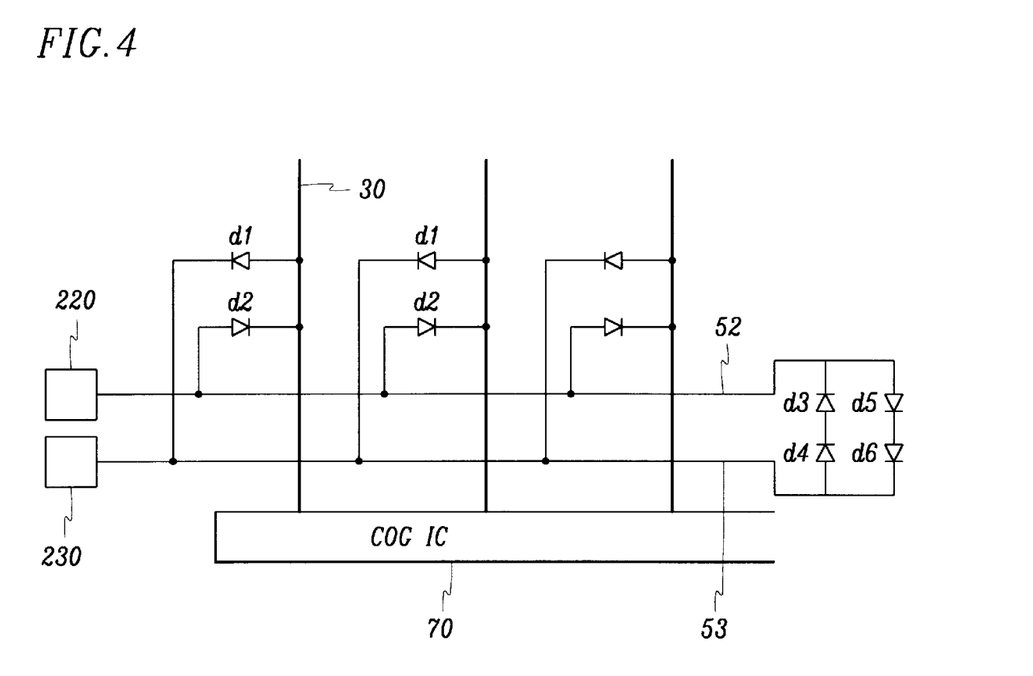
FIG. 4 is a circuit diagram of a protection circuit shown in FIG. 3.

FIG. 3 schematically shows a liquid crystal display in accordance with the first embodiment. FIG. 4 shows an ESD protection circuit of FIG. 3.

As shown in FIGS. 3 and 4, a plurality of gate lines 20 are formed horizontally and a plurality of data lines 30 are formed vertically on a substrate 10. Driving elements 70 apply signals to the gate lines 20 and the data lines 30. The driving elements are packaged as COG.

Protection diodes d1 and d2 are connected to one of gate lines in forward and reverse directions, respectively. In the same manner, protection diodes d1 and d2 are also connected to one of data lines 30 in forward and reverse directions, respectively. Other diodes may be connected to the diodes d1 and d2 in series.

The diodes d1 and d2 are connected to shorting lines 52 and 53, respectively. Pads 220 and 230 are formed at the end of the shorting lines 52 and 53.

As shown in FIG. 4, a pair of serially connected diodes d3 and d4 and another pair of serially connected diodes d5 and d6 may be connected together in parallel in opposite directions between shorting lines 52 and 53. This structure increases protection from static electricity.

That is to say, when positive electrostatic charges are generated in a certain data line, they flow to the shorting line 53 through the diode d1 connected to the data line 30 in the same direction as the current flow, and they flow to shorting line 52 through the diodes d3 and d4. They flow to all the data lines 30 through the diodes d2. The electrostatic charges spread to all the data lines 30 through the diodes d2 and d4, and dissipate away.

Electrostatic charges cause high voltage. In accordance with the present invention, the long path of the static electricity reduces the voltage due to electrostatic charges and the charges dissipate while flowing. So, during the above process, additional protection is provided against electrostatic discharge.

A method for testing display quality of an LCD in accordance with the first embodiment will be described hereinafter.

Display quality can be tested by applying different signals to the pads 220 and 230 separately before assembling the substrate for an LCD.

A second embodiment of present invention will be described hereinafter.

Figure 5:
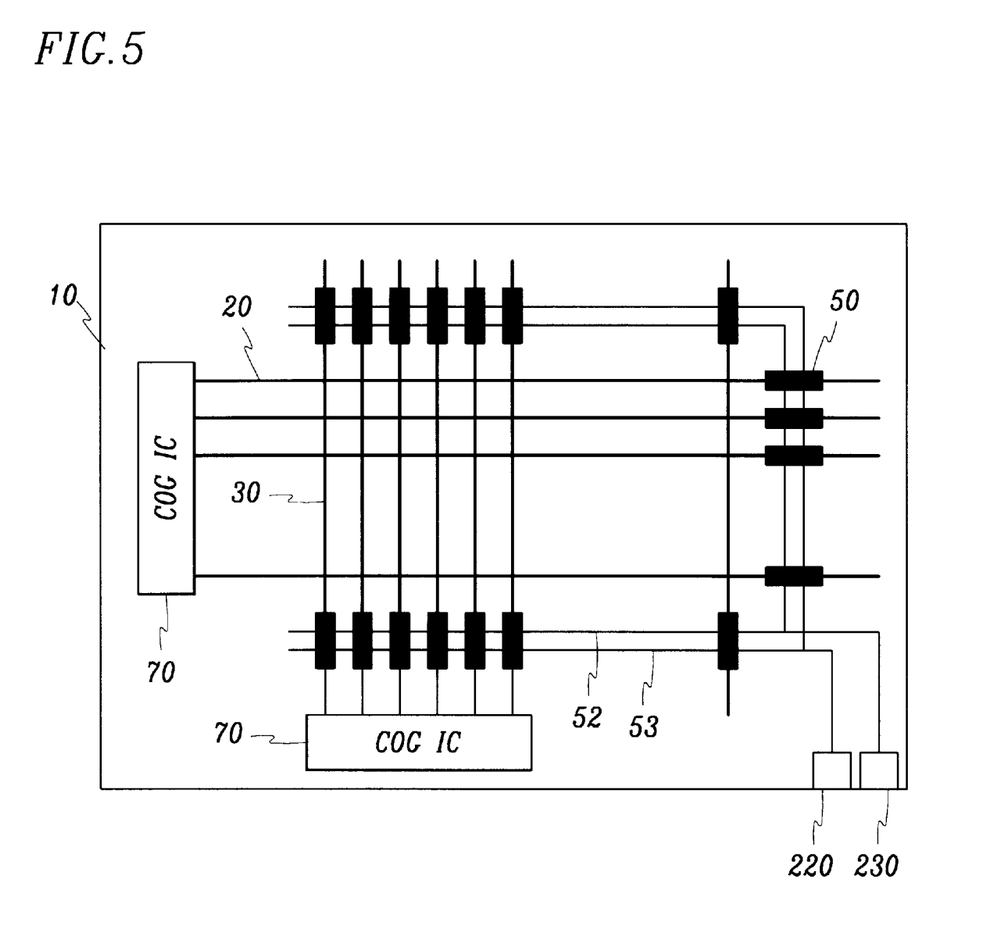
FIG. 5 is a wiring diagram of a LCD substrate in accordance with a second embodiment of the present invention.
Figure 6:
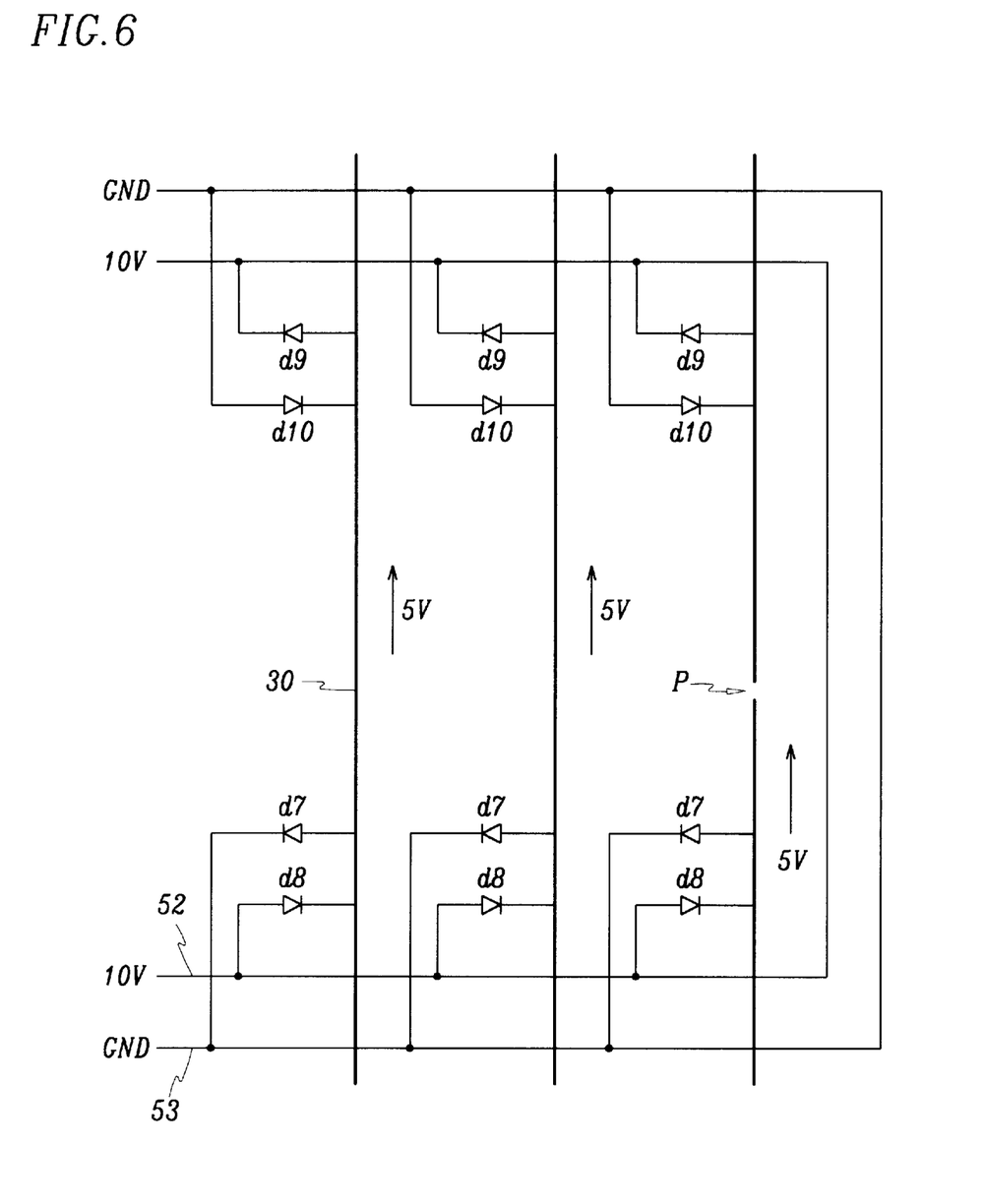
FIG. 6 is a circuit diagram illustrating a connection state of a protection circuit in FIG. 5.

FIG. 5 is a wiring diagram in an LCD substrate in accordance with a second embodiment of the present invention. FIG. 6 is a circuit diagram illustrating a connection state of protection diodes in FIG. 5.

This embodiment includes protection circuits at the upper and lower parts of the substrate. Because the protection circuits are provided in two parts of the substrate, electrostatic charges dissipate fast and ESD protection is enhanced.

However, when testing the data lines, disconnection of data lines 30 is hard to find because testing signals are applied from the both ends of the data lines 30.

FIG. 6 shows the principle of detecting the disconnection of the data lines 30.

As shown in FIG. 6, diodes d7 and d8 are connected to one side of data lines 30 in forward and reverse directions, respectively. The diodes d7 are connected to a shorting line 53, to which 0 volt is applied and the diodes d8 are connected to the shorting line 52, to which 10 volt is applied. Diodes d9 and d10 are connected to the other side of the data lines 30 in forward and reverse directions respectively. The diode d9 is connected to the shorting line 52 in which 10 volt is applied, and the diode d10 is connected to the shorting line 53 wherein 0 volt is applied.

When 10 volt is applied to the shorting line 52 and 0 volt is applied to shorting line 53 to detect the disconnection of the data line 30, the lower diodes d7 and d8 turn on and a voltage difference of 5 V is generated between the diode d7 and d8. Therefore, the current due to that voltage difference flows from one side of the data lines 30. Voltage is not applied to the opposite end of the data lines 30, because the diodes d9, d10 are connected to the grounding line 52 and 53 in the reverse direction as the diodes d7 and d8 do not turn on.

Therefore, the disconnection of the data line 30 is detected easily, because current flows in only one direction of the data lines 30 and testing voltage is not transferred to the other side of the disconnection point in the data lines 30.

Figure 7:
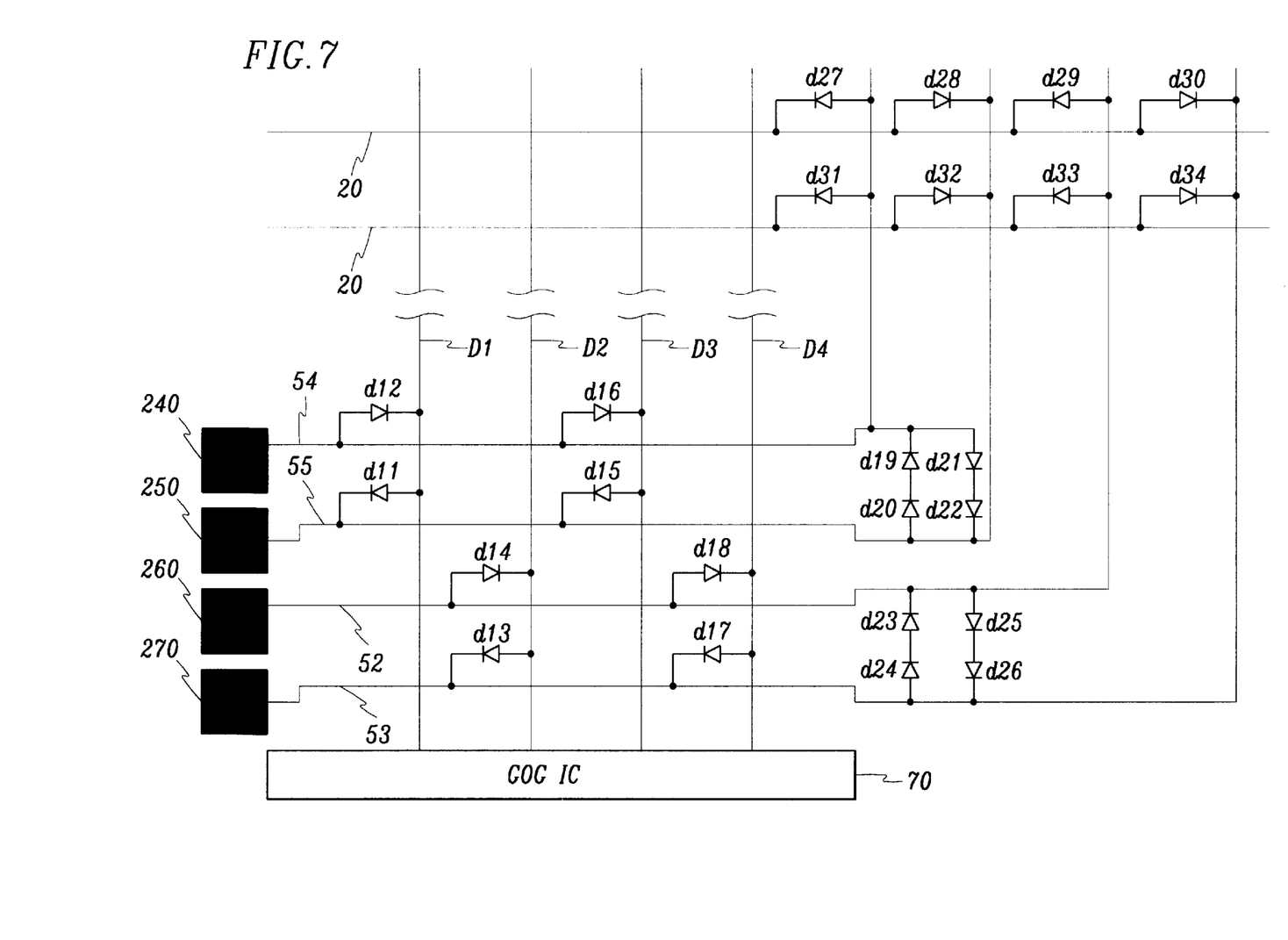
FIG. 7 is a circuit diagram of a protection circuit in accordance with a third embodiment of the present invention.

FIG. 7 is a circuit diagram of protection diodes in accordance with a third preferred embodiment of the present invention.

As shown In FIG. 7, four shorting lines 52, 53, 54 and 55 are formed to cross data lines D1, D2, D3 and D4 and the end of the gate line 20 and diodes are connected to the data lines D1, D2, D3 and D4 in the same manner as in FIGS. 3–6. The even data lines D2 and D4 are connected to the shorting lines 52 and 53 via diodes and the odd data lines D1 and D3 are connected to the shorting lines 54 and 55 via diodes.

When electrostatic charges are generated in the data line D1, they flow through the diode d11 into the shorting line 55. The charges flow into the shorting line 54 through the diodes d20 and d19, and into the diodes d16 and d12. While static electricity flows through this path, the voltage due to the electrostatic charges turns low and electrostatic charges dissipate away. Due to this operation, a liquid crystal display is protected from ESD.

The short-circuit between the contiguous data lines can be detected by applying different testing voltages to the contiguous data lines D1, D2, D3 and D4. That is, different voltages are applied to pads 240 and 250 and pads 260 and 270 connected to the shorting lines 52, 53, 54 and 55, the voltages of contiguous data lines are different. Therefore, if contiguous data line is short-circuited, white defect on the pixel appears.

Figure 8:
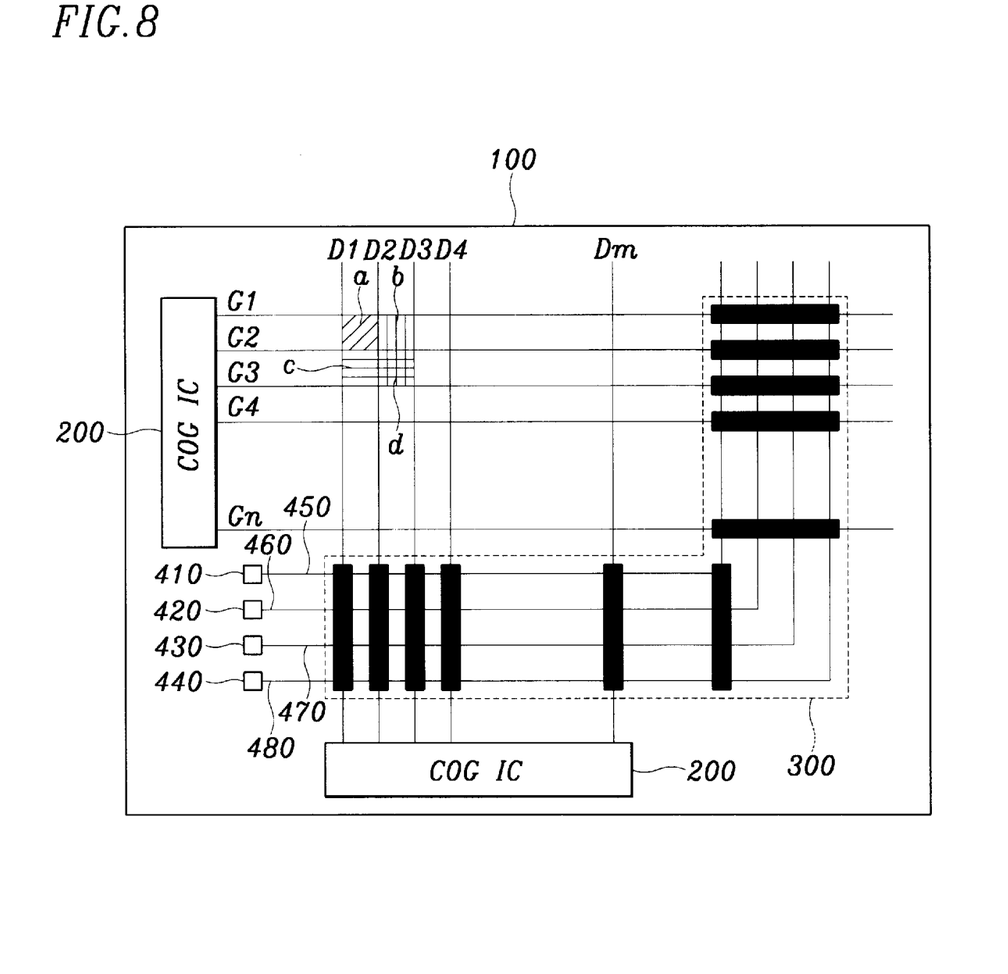
FIG. 8 is a wiring diagram of a liquid crystal display substrate in accordance with a fourth embodiment of the present invention.
Figure 9:
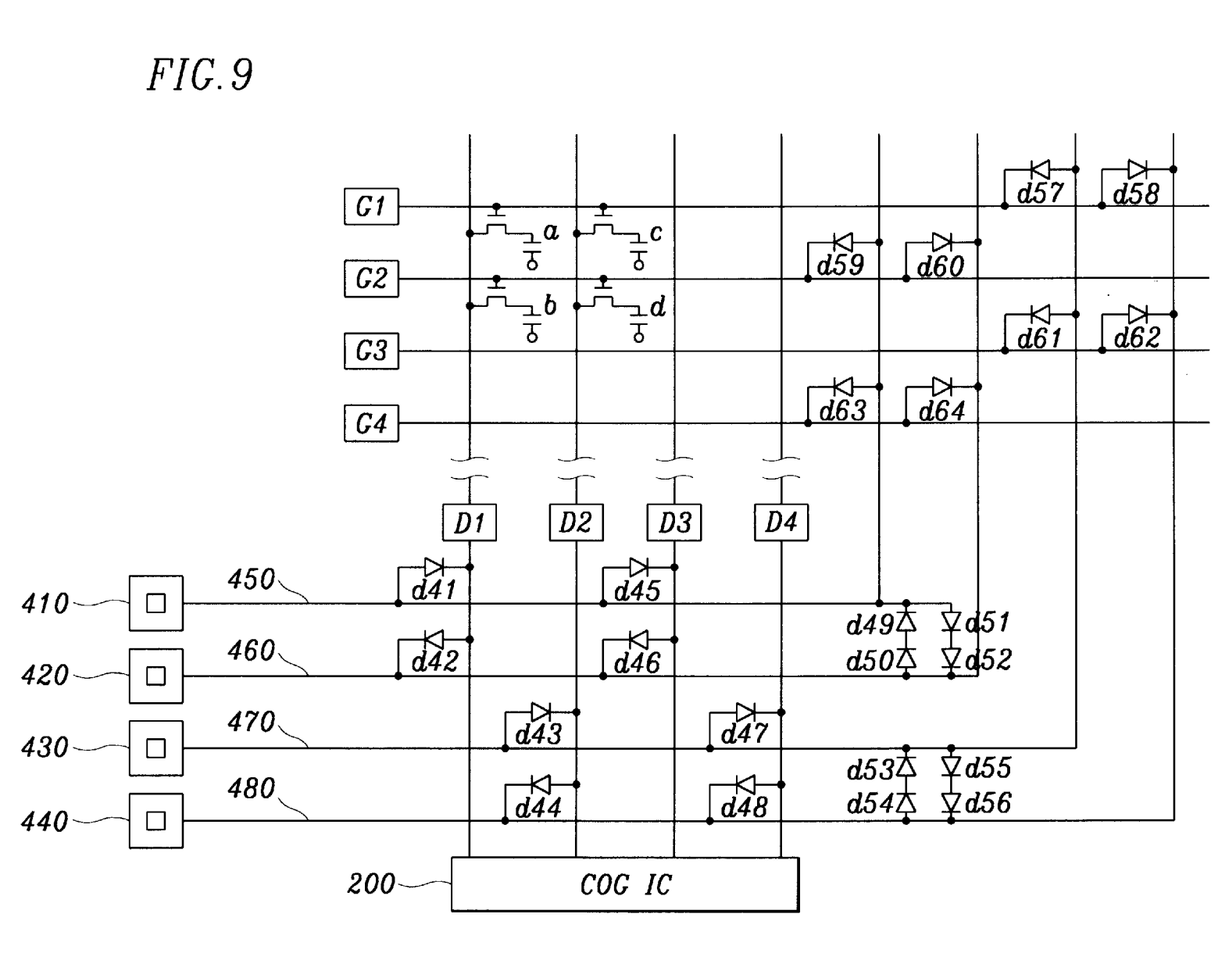
FIG. 9 is a circuit diagram of protection diodes shown in FIG. 8.

FIG. 8 is a schematic diagram of wires in an LCD substrate in accordance with a fourth embodiment of the present invention. FIG. 9 is a circuit diagram of protection circuits diagram of protection circuits shown in FIG. 8.

As shown in FIG. 8 and FIG. 9, an LCD substrate according to this embodiment includes an insulating substrate 100, a COG IC 200, pads 410, 420, 430 and 440, shorting lines 450, 460, 470 and 480, a plurality of gate lines G1, G2, . . . , Gn, a plurality of data lines and an ESD protection circuit.

In this embodiment, a plurality of gate lines G1, G2, . . . , Gn are extended horizontally on the insulating substrate 100, and a plurality of data lines D1, D2, . . . , Dm are extended vertically on the insulating substrate 100. The gate lines G1, G2, . . . , Gn and the data lines D1, D2, . . . , Dm are connected to the COG IC 200, and the shorting lines 450, 460, 470 and 480 intersect the gate lines G1, G2 . . . , Gn and the data lines D1, D2, . . . , Dm. Pads 410, 420, 430, 440 are connected to the ends of shorting lines 450, 460, 470, 480.

As shown in FIG. 9, diodes d41, d45, d59 and d63 are connected from the shorting line 450 to the data lines D1 and D3 and the gate lines G2 and G4 in the forward direction respectively, and diodes d42, d46, d60 and d64 are connected from the shorting line 460 to the data lines D1, D3 and the gate lines G2, G4 in the reverse direction respectively. Diodes d43, d47, d57 and d61 are connected from the shorting line 470 to the data lines D2, D4 and the gate lines G1, G3 in the forward direction, and diodes d44, d48, d58, d62 are connected from the shorting line 480 to the data lines D2, D4 and the gate lines G1, G3 in the reverse direction respectively. Serially connected diodes d49 and d50 connects the shorting line 460 to the shorting line 450 in a forward direction, and another pair of serially connected diodes d51 and d52 connects the shorting line 460 to the shorting line 450 in a reverse direction. A pair of serially connected diodes d53 and d54 connects the shorting line 480 to the shorting line 470 in a forward direction, and another pair of serially connected diode d55 and d56 connects the shorting line 480 to the shorting line 470 in a reverse direction.

Figure 10:
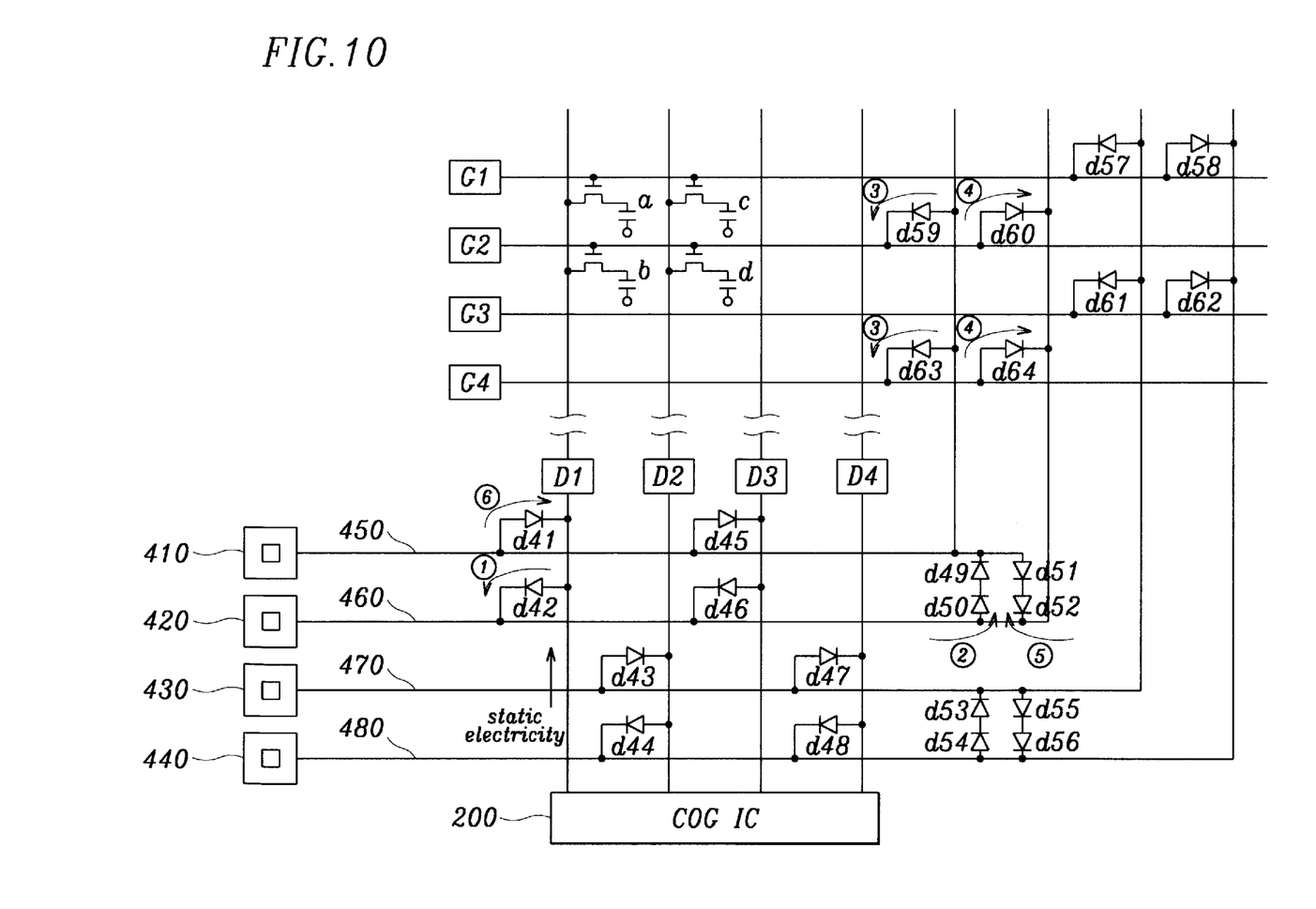
FIG. 10 is a circuit diagram of the protection diodes shown in FIG. 8 illustrating a flow of static electricity.

The operation of the circuit in FIG. 9 is described hereinafter with reference to enclosed FIG. 10.

First, it is assumed that electrostatic charges are generated in the data line D1.

The electrostatic charges flow into the shorting line 460 along the path (1) through the diode d42.

The electrostatic charges flowing through path (1) flows through path (2) on the ground of diode d49 and d50 being connected to the shorting line 450 in the forward direction.

The electrostatic charges flowing through path (2) flows along the path (3) through the diode d59 and d63, and flows along path (6) through the diode d41 and d45.

The electrostatic charges flowing along the path (3) flows through the gate line G2 and G4; and flows along path (4) through the diodes d60 and d64 connected from the gate lines G2 and G4 to the shorting line 460 in the forward direction.

The electrostatic charges flowing along the path (4) flows along path (5) through the diode d59 and d60 connected from the shorting line 460 to the shorting line 450 in the forward direction.

The electrostatic charges flowing along the path (5) flows along path (6) through the diode d41 connected from the shorting line 450 to the data line D1 in the forward direction.

The electrostatic charges occurring in the data line D1 returns to the data line D1 through the above route.

Although static electricity is characterized to have little charge and a high voltage transiently, its current dissipates away and its voltage turns low while flowing through the above-described route. Therefore, local electrostatic charges are prevented from flowing to the panel and the panel is protected from breaking. When testing the display quality of an LCD, a certain signal is inputted to pads 410, 420, 430 and 440 as shown in FIG. 8 and FIG. 9.

Figure 12:
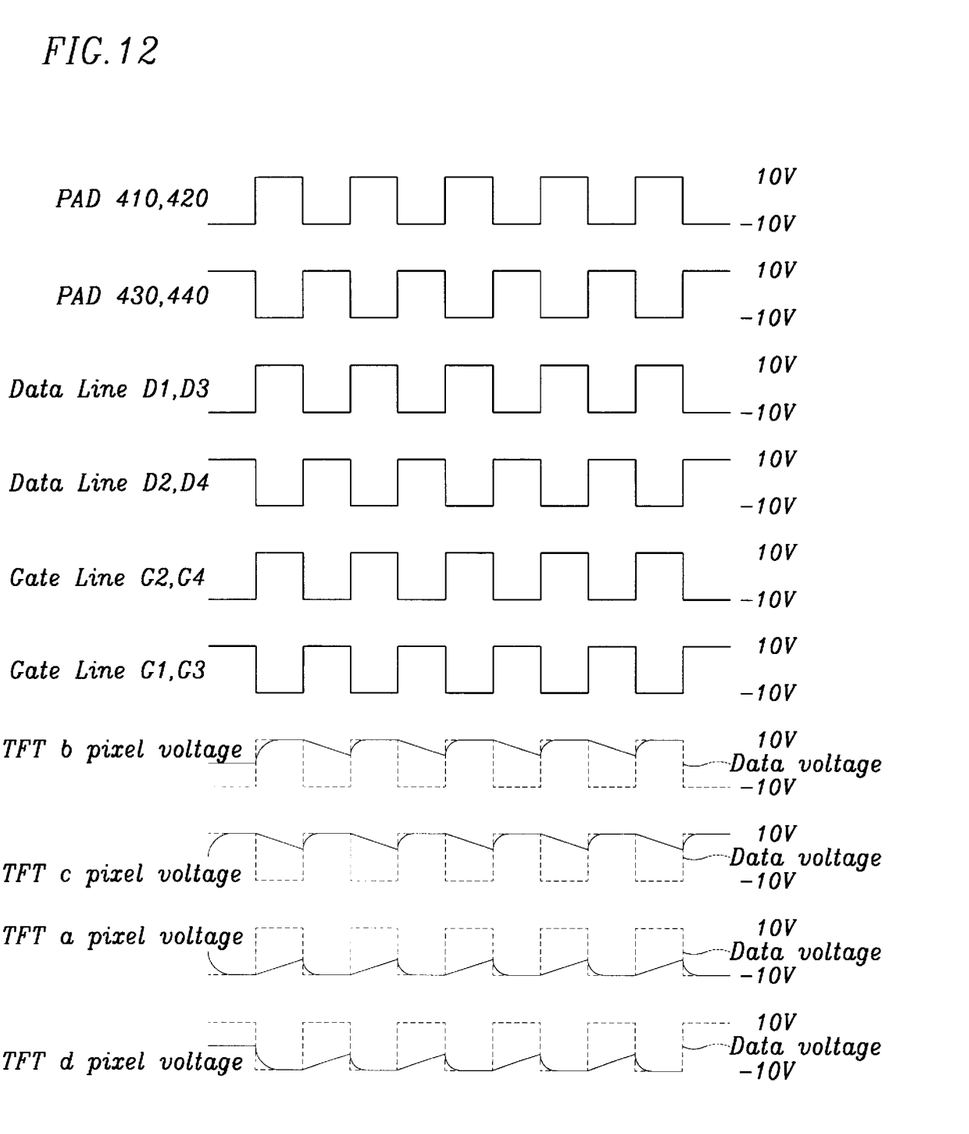
FIG. 12 shows waveforms of testing clock pulses and output voltage of pixels according to the fourth preferred embodiment of the present invention.

FIG. 12 shows testing clock pulses and pixel's output voltages of fourth embodiment.

As shown in FIG. 12, the same testing signal is inputted to pads 410, 420 and pads 430, 440. Because the same signal is inputted to pads 410, 420, the same signal is inputted to the data lines D1, D3 and the gate lines G2, G4 simultaneously. Because the same signal is inputted to pads 430 and 440, the same signal is inputted to the data lines D2, D4 and the gate lines G1, G3.

Figure 11:
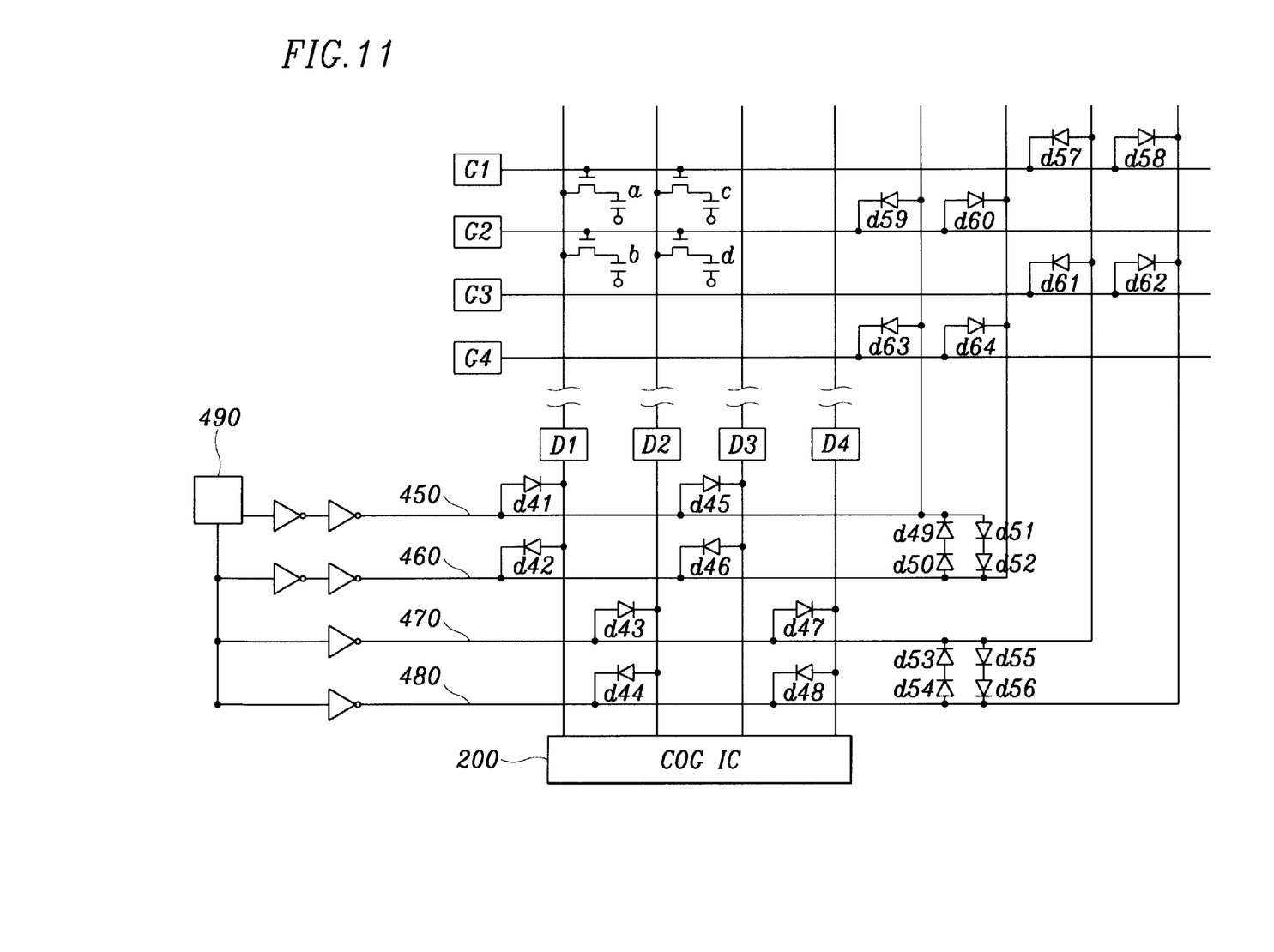
FIG. 11 is a circuit diagram of the protection diodes shown in FIG. 8 in which pads are used.

As shown in FIG. 12, the signal inputted to pads 410 and 420 is a clock pulse switching 10V to −10V. The signal inputted to pads 430 and 440 is an inverted clock pulse inputted to pads 410 and 420. For the method of inputting these signals, inverters can be inserted to pad as shown in FIG. 11.

Voltage levels of 10V to −10V can be adjusted in accordance with Vcom voltage. In this embodiment, Vcom voltage is assumed to be 0V.

As shown in FIG. 12, the signal inputted to the data lines D1, D3 and the gate lines G2, G4 is the same as the signal inputted to pads 410 and 420 and the signal inputted to the data lines D2, D4 and the gate lines G1, G3 is the same as the signal inputted to pads 430 and 440, When these testing signals are applied to pads, output voltages of pixels Va, Vb, Vc and Vd are described.

The output voltage of pixel a, Va, is as follows. When the gate G1 voltage of pixel a is 10V, the data D1 voltage of pixel a is −10V and when the gate G1 voltage of pixel a is −10V, the data D1 voltage of pixel is 10V. In the former case, the TFT of pixel a turns on and data D1 input voltage is −10V, so output voltage of pixel a, Va, keeps around −10V. In the latter case, the TFT of pixel a turns off, so, the charge kept in the capacitor of pixel a, Ca, is discharged and output voltage of pixel a, Va, changes a little high. By the above operation, output voltage of pixel a, Va, becomes as shown in FIG. 12.

The output voltage of pixel b, Vb, is as follows. When the gate G2 voltage of pixel b is 10V, the data D1 voltage of pixel a is 10V and when the gate G2 voltage of pixel b is −10V, the data D1 voltage of pixel b is −10V. In the former case, the TFT of pixel b turns on and data D1 input voltage is 10V, so output voltage of pixel a, Vb, keeps around 10V. In the latter case, the TFT of pixel b turns off, so, the charge kept in the capacitor of pixel b, Cb, is discharged and output voltage of pixel b, Vb, changes a little low. By the above operation, output voltage of pixel b, Vb, becomes as shown in FIG. 12.

The output voltage of pixel of Vc, is as follows. When the gate G1 voltage of pixel c is 10V, the data D2 voltage of pixel c is 10V and when the gate G1 voltage of pixel c is −10V, the data D2 voltage of pixel c is −10V. In the former case, the TFT of pixel c turns on and data D2 input voltage is 10V, so output voltage of pixel c, Vc, keeps around 10V. In the latter case, the TFT of pixel c turns off, so, the charge kept in the capacitor of pixel c, Cc, is discharged and output voltage of pixel c, Vc, changes a little low. By the above operation, output voltage of pixel c, Vc, becomes as shown in FIG. 12.

The output voltage of pixel d, Vd, is as follows. When the gate G2 voltage of pixel d is 10V, the data D2 voltage of pixel d is −10V and when the gate G2 voltage of pixel d is −10V, the data D2 voltage of pixel d is 10V. In the former case, the TFT of pixel d turns on and data D2 input voltage is −10V, so output voltage of pixel d, Vd, keeps around −10V. In the latter case, the TFT of pixel d turns off, so, the charge kept in the capacitor of pixel d, Cd, is discharged and output voltage of pixel d, Vd, changes a little low. By the above operation, output voltage of pixel d, Vd, becomes as shown in FIG. 12.

Therefore, if the signal inputted to pad is as shown in FIG. 12, the out put voltages of pixels Va, Vb, Vc, Vd are as shown in FIG. 12. That is, the output voltage of pixel a, Va, keeps around −10V, and output voltage of pixel b keeps around 10V, and the output voltage of pixel c, Vc, keeps around 10V, and output voltage of pixel d keeps around −10V. Accordingly, the output voltages of contiguous pixels are mutually inverted. That, is, the output voltages of pixel a and b, pixel b and c, pixel c and d are inverted voltages.

If contiguous lines of pixels is normal and Vcom voltage is 0V, pixels a, c and pixels b, d have same color separately. If contiguous lines of pixels are short, there is little difference between the output voltages of that pixels and Vcom voltage and white defect appears on pixel.

Therefore, in accordance with this embodiment, the short of data lines and gate lines between pixels can be detected easily.

This embodiment suggests the liquid crystal display having 4 shorting lines, but there can be more shorting lines. And the number of diodes can change diversely.

The present invention may be adapted to another fields.

In the drawings and specification, there have been disclosed typical preferred embodiments of the present invention and, although specific terms are employed, they are used in a generic and descriptive sense only and not for purposes of limitation, the scope of the invention being set forth in the following claims.

What is claimed is:

1. A liquid crystal display having a plurality of pixels comprising:
   an insulating substrate;
   a plurality of data lines transmitting image signals to the pixels on the substrate;
   a plurality of gate lines transmitting scanning signals to the pixels on the substrate;
   a first shorting line which can be applied with a first external voltage;
   a second shorting line which can be applied with a second external voltage;
   a plurality of first diodes connected from said first shorting line to said data lines;
   a plurality of second diodes connected from said data lines to said second shorting line;
   a third diode connected from said first shorting line to said second shorting line; and
   a fourth diode connected from said second shorting line to said first shorting line.

2. The liquid crystal display device of claim 1, wherein the first and second diodes are connected to one ends of the data lines, and further comprising a plurality of fifth diodes connected from the other ends of the data lines to the first shorting line, a plurality of sixth diodes connected from the second shorting line and to the other ends of the data lines, and a chip on glass lying on the substrate.

3. A liquid crystal display having a plurality of pixels comprising:
   an insulating substrate;
   a plurality of data lines transmitting image signals to the pixels on the substrate;
   a plurality of gate lines transmitting scanning signals to the pixels on the substrate;
   a first shorting line which can be applied with a first external voltage;
   a second shorting line which can be applied with a second external voltage;
   a plurality of first diodes connected from said first shorting line to said data lines;
   a plurality of second diodes connected from said data lines to said second shorting line;
   a third grounding which can be applied with a third external voltage;
   a fourth shorting line which can be applied with a fourth external voltage;
   a plurality of fifth diodes connected from said third shorting line to said first data line; and
   a plurality of sixth diodes connected from the first data line to said fourth shorting line.

4. The liquid crystal display device of claim 3, wherein the first data line is an even data line and the second data line is an odd data line.

5. A liquid crystal display of claim 4, wherein the liquid crystal display comprises:
   a plurality of seventh diodes connected from the first shorting line to the first gate line;
   a plurality of eighth diodes connected from the second gate line to the second shorting line;
   a plurality of ninth diodes connected from the third shorting line to the second gate line; and
   a plurality of tenth diodes connected from the second gate line to the fourth shorting line; and a chip on glass lying on the substrate.

6. A liquid crystal display device of claim 5, where in the first gate line is an even gate line, the second gate line is an odd gate line.

7. A testing method of display quality of a liquid crystal display, which comprises an insulating substrate, a plurality of data lines transmitting image signals to the pixels on the substrate, a plurality of gate lines transmitting scanning signals to the pixels on the substrate, a first shorting line which can be applied with a first external voltage, a second shorting line which can be applied with a second external voltage, a plurality of first diodes connected from said first shorting line to said data lines, a plurality of second diodes connected from data lines to said second shorting line, a plurality of third diodes connected from said first shorting line to said second shorting line, and a plurality of fourth diodes connected from said second shorting line to said first shorting line, comprising the steps of:

applying a first test signal to said first shorting line; and applying a second test signal different from the first test signal to said second shorting line.

8. The testing method of claim 7, further comprising the steps of:

applying a third test signal different from the first and second signal; and applying a fourth test signal different from the first and second signal.

9. A testing method of display quality of claim 8, wherein the first data line is an odd data line and the second data line is an even data line.

10. A testing method of display quality of claim 9, wherein the method inputs other signals to the first, second shorting line and the third, fourth shorting line in a liquid crystal display device which comprises in addition the fifth diode connected from the third shorting line to the first gate line in the same direction as the current flow, the sixth diode connected from the fourth shorting line to the first gate line in the direction opposite to the current flow, the seventh diode connected from the first shorting line to the second gate line in the same direction as the current flow, the eighth diode connected from the second shorting line to the second gate line in the direction opposite to the current flow.

11. A testing method of display quality of claim 8, wherein the method applies a clock pulse to the first, second shorting line and applies a clock pulse inverted to the clock pulse to the third, fourth shorting line.

12. The testing method of display quality of claim 10, wherein the method applies a clock pulse to the first and second shorting lines, and applies an inverted clock pulse to the third and fourth shorting lines.

* * * * *